United States Patent
Kim et al.

(10) Patent No.: US 7,880,353 B2
(45) Date of Patent: Feb. 1, 2011

(54) SPINDLE MOTOR HAVING HOLDING MAGNET PREVENTING OIL DISCHARGE

(75) Inventors: Nam Seok Kim, Gyeonggi-do (KR); Pyo Kim, Gyeonggi-do (KR); Sang Ok Choi, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/637,171

(22) Filed: Dec. 12, 2006

(65) Prior Publication Data

US 2007/0132326 A1    Jun. 14, 2007

(30) Foreign Application Priority Data

Dec. 12, 2005  (KR) .................. 10-2005-0121753

(51) Int. Cl.
  *H02K 5/16*  (2006.01)
  *H02K 5/124*  (2006.01)
  *H02K 5/167*  (2006.01)
(52) U.S. Cl. ................... 310/90; 310/51; 310/67 R
(58) Field of Classification Search .............. 310/90, 310/51, 90.5, 156.04, 67 R; 417/423.12, 417/354, 363; 360/99.08
  See application file for complete search history.

(56) References Cited

U.S. PATENT DOCUMENTS 5,561,335 A  * 10/1996  Dunfield et al. .......... 310/90.5
5,574,322 A  * 11/1996  Nii et al. ................. 310/90.5
5,578,882 A  * 11/1996  Dunfield et al. .......... 310/90.5

(Continued)

FOREIGN PATENT DOCUMENTS

| JP | 2003079095 | * | 3/2003 |
| JP | 2003-299302 | | 10/2003 |
| JP | 2003299332 | * | 10/2003 |
| JP | 2004104915 | * | 4/2004 |
| JP | 10-2004-0098082 | | 11/2004 |
| KR | 2002-39472 | | 5/2002 |

OTHER PUBLICATIONS

Machine translation of JP 2003-299302, "Spindle Motor With Axial Vibration Preventing Mechanism", Oct. 17, 2003.*

(Continued)

*Primary Examiner*—Karl I Tamai

(57) ABSTRACT

Disclosed herein is a spindle motor. The spindle motor includes a rotating shaft, a rotor cover which is secured to the rotating shaft and rotates the rotating shaft, a bearing for rotatably supporting the rotating shaft, a holder for holding the bearing, and a holding magnet which is directly mounted to an inner wall of the rotor cover. In this case, the holding magnet is positioned above the bearing to prevent oil from being discharged from the bearing to the outside.

5 Claims, 2 Drawing Sheets

U.S. PATENT DOCUMENTS

| | | | |
|---|---|---|---|
| 6,265,798 B1* | 7/2001 | Huang et al. | 310/90.5 |
| 6,911,749 B1* | 6/2005 | Ho et al. | 310/67 R |
| 6,982,510 B1* | 1/2006 | Ajello et al. | 310/90 |
| 2004/0046467 A1* | 3/2004 | Huang et al. | 310/90.5 |
| 2004/0239197 A1* | 12/2004 | Tsuchiya | 310/90 |
| 2005/0179327 A1* | 8/2005 | Horng et al. | 310/51 |
| 2007/0001523 A1* | 1/2007 | Ko et al. | 310/51 |
| 2007/0132326 A1* | 6/2007 | Kim et al. | 310/90 |

OTHER PUBLICATIONS

Machine Translation of JP 2003-079095, "Axial Vibration Preventing Mechanism and Brushless Motor Provided Therewith", Tsuchiya, Masahisa, Mar. 14, 2003.*

Korean Patent Office Action, dated Nov. 22, 2006, and issued in corresponding Korean Patent Application No. 10-2005-0121753.

Japanese Office Action dated Sep. 15, 2009 and issued in corresponding Japanese Patent Application 2006-331623.

* cited by examiner

SPINDLE MOTOR HAVING HOLDING MAGNET PREVENTING OIL DISCHARGE

CROSS REFERENCE TO RELATED APPLICATION(S)

This application claims the benefit of Korean Patent Application No. 10-2005-0121753, filed Dec. 12, 2005, entitled "spindle motor", which is hereby incorporated by reference in its entirety into this application.

BACKGROUND OF THE INVENTION

1. Field of the Invention

The present invention relates generally to spindle motors and, more particularly, to a spindle motor, in which the number of parts is reduced, and the yield rate of which is increased.

2. Description of the Related Art

As well known to those skilled in the art, a spindle motor is a device which is mounted on an optical disk drive to drive a turntable, thus rotating a disk mounted on the turntable. Generally, as shown in FIG. 2, a spindle motor 200 includes a rotary unit 201 and a stationary unit 205.

The rotary unit 201 is the rotating part of the motor 200, and includes a rotating shaft 211, a rotor cover 221, and a magnet 231.

The rotating shaft 211 functions to rotate a turntable (not shown).

The rotor cover 221 serves to rotate the rotating shaft 211. A shaft fitting hole 222 is formed in the center of the rotor cover 221 so that the rotating shaft 211 is fitted into the shaft fitting hole 222. An oil discharge preventing piece 223 is mounted to an end of the shaft fitting hole 222 to prevent oil from being discharged from a bearing 215. Further, the rotor cover 221 extends in a circumferential direction, and an edge of the rotor cover 221 is bent downwards to cover a stator 235.

The magnet 231 forms a magnetic field, and is secured to an inner wall 224 of the rotor cover 221.

The stationary unit 205 is the fixed part of the motor 200, and includes the bearing 215, a holder 225, the stator 235, and a base 245.

The bearing 215 rotatably supports the rotating shaft 211.

The holder 225 holds the bearing 215 to secure the bearing 215 to a predetermined position. The bearing 215 is firmly coupled to the inner circumferential surface of the holder 225.

The stator 235 forms an electric field when external power is applied to the stator 235. The stator 235 is firmly coupled to the outer circumferential surface of the holder 225.

Further, a holding magnet 236 is coupled to the upper portion of the inner circumferential surface of the stator 235 via a back yoke 237, and holds the disk to prevent the disk from being damaged when the disk (not shown) is rotated.

The base 245 functions to support the entire motor 200. The central portion of the base 245 extends outwards, thus defining an insertion hole 246. A printed circuit board 247 is mounted on the upper surface of the base 245, and controls a signal for driving the motor 200.

However, the conventional spindle motor 200 constructed as described above is problematic in that the motor 200 is provided with the back yoke 237 to install the holding magnet 236, and is provided with the oil discharge preventing piece 223 to prevent oil from being discharged from the bearing 215 to the outside, so that the number of parts is increased, the manufacturing process is complicated, and thereby the yield rate is reduced.

SUMMARY OF THE INVENTION

Accordingly, the present invention has been made keeping in mind the above problems occurring in the prior art, and an object of the present invention is to provide a spindle motor, which is constructed so that a holding magnet is directly mounted on a rotor cover, thus reducing the number of parts and enhancing the yield rate.

Another object of the present invention is to provide a spindle motor, in which a holding magnet is installed adjacent to the upper portion of a bearing, thus preventing oil from being discharged from the bearing to the outside without using an additional part.

In order to accomplish the above objects, the present invention provides a spindle motor, including a rotating shaft, a rotor cover secured to the rotating shaft and rotating the rotating shaft, a bearing for rotatably supporting the rotating shaft, a holder for holding the bearing, and a holding magnet directly mounted to an inner wall of the rotor cover.

In the spindle motor of the present invention, the holding magnet is positioned above the bearing to prevent oil from being discharged from the bearing to the outside.

Further, the holding magnet is mounted to the rotor cover in such a way as to be adjacent to the rotating shaft.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a spindle motor, according to the preferred embodiment of the present invention, will be described in detail with reference to the accompanying drawing.

Figure 1:
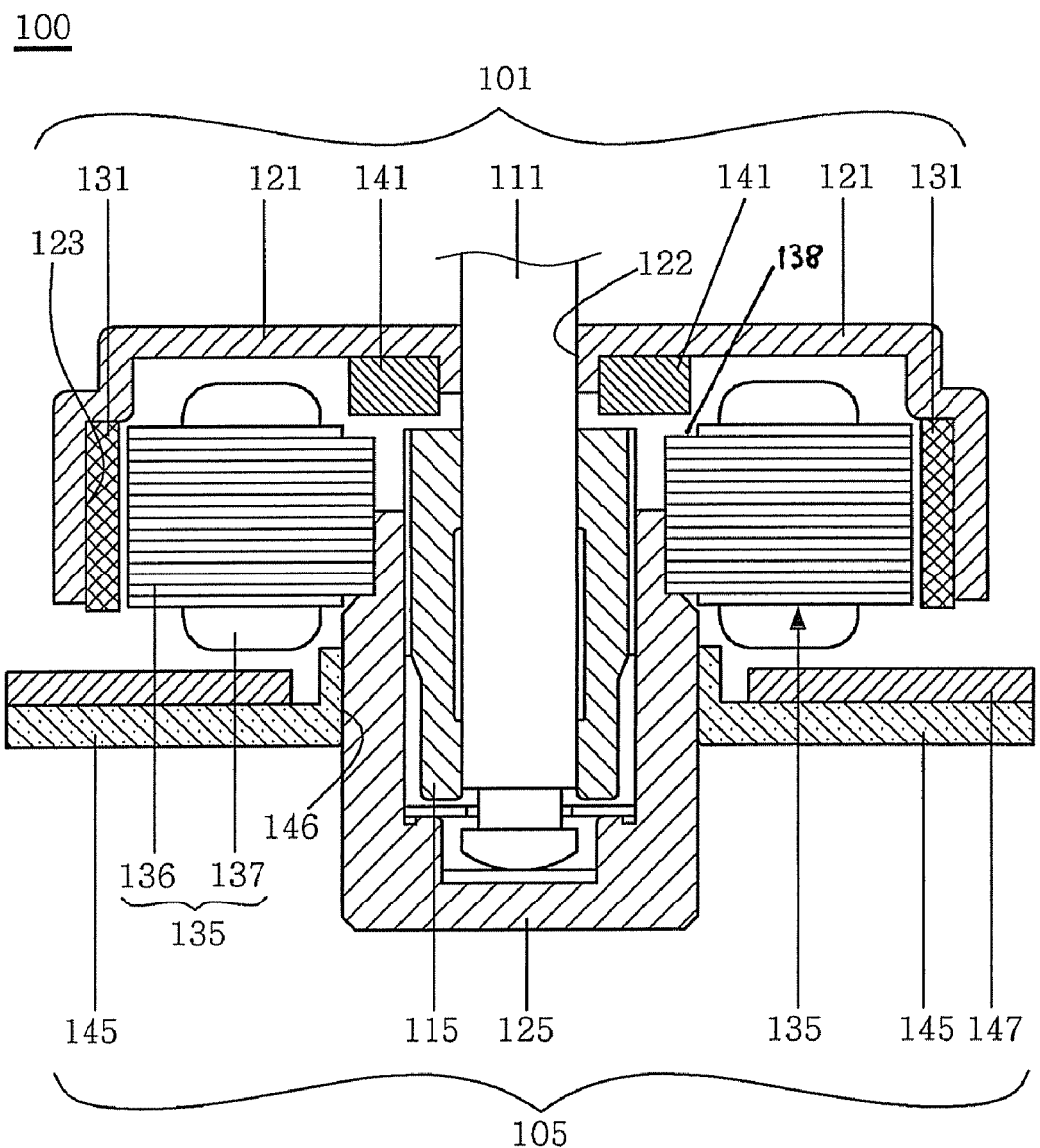
FIG. 1 is a schematic sectional view showing a spindle motor, according to the preferred embodiment of the present invention.
Figure 2:
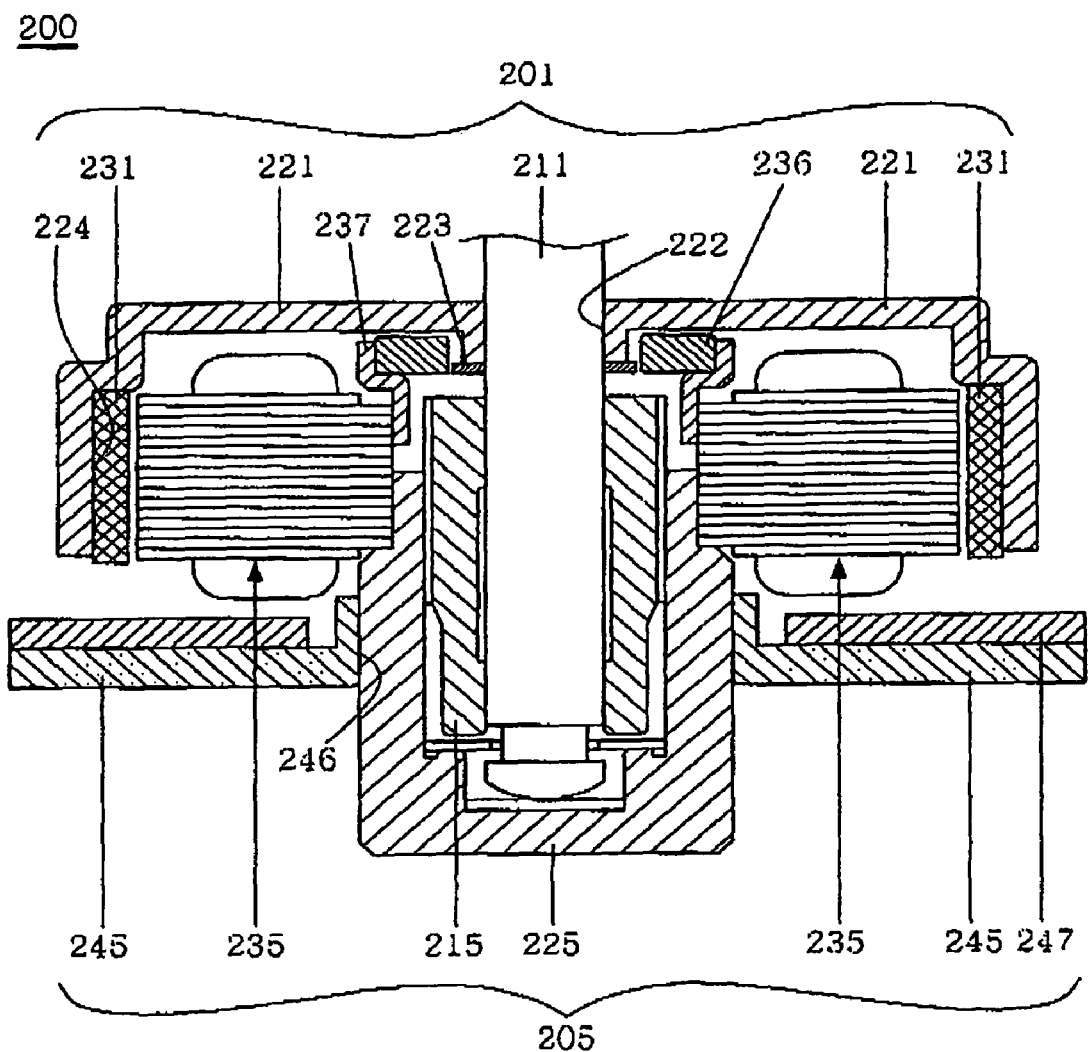
FIG. 2 is a schematic sectional view showing a conventional spindle motor.

As shown in FIG. 1, a spindle motor 100 includes a rotary unit 101 and a stationary unit 105.

The rotary unit 101 is the rotating part of the motor 100, and is provided with a rotating shaft 111, a rotor cover 121, a magnet 131, and a holding magnet 141.

The rotating shaft 111 rotates a turntable (not shown).

The rotor cover 121 serves to rotate the rotating shaft 111, with a shaft fitting hole 122 formed in the center of the rotor cover 121 for fitting the rotating shaft 111 into the shaft fitting hole 122. Further, the rotor cover 121 extends in a circumferential direction, and an edge of the rotor cover 121 is bent downwards to cover a stator 135.

The magnet 131 forms a magnetic field, and is secured to an inner wall 123 which is provided on the downwardly bent edge of the rotor cover 121.

The holding magnet 141 is mounted to the inner surface of the rotor cover 121 so as to prevent a disk from being damaged when the disk is rotated. Unlike the prior art, the holding magnet 141 is directly mounted to the rotor cover 121 without using a back yoke, and is installed adjacent to the rotating shaft 111. Further, in order to prevent oil from being discharged from the bearing 115 to the outside when the rotating shaft 111 is rotated, the holding magnet 141 is installed adjacent to the bearing 115.

The stationary unit 105 is the fixed part of the motor 100, which is not rotated, and is provided with the bearing 115, a holder 125, the stator 135, and a base 145.

The bearing 115 rotatably supports the rotating shaft 111.

The holder 125 holds the bearing 115 to secure the bearing 115 to a predetermined position. The bearing 115 is firmly coupled to the inner circumferential surface of the holder 125.

The stator 135 forms an electric field when external power is applied to the stator 135. The stator 135 has a bobbin 136 which is secured to the outer circumferential surface of the holder 125, and a coil 137 which is wound on the bobbin 136. The stator 135 includes a recess 138 in an inner end of an upper side of the stator 135. The holding magnet 141 is positioned above the stator 135 and has an outer diameter larger than an inner diameter of the stator 135 and smaller than an outer diameter of the recess 138 so that its magnetic force directly affects the stator 135.

The base 145 functions to hold the entire motor 100. The central portion of the base 145 is bored and an edge of the bored portion protrudes outwards, thus forming an insertion hole 146. A printed circuit board 147 is mounted on the upper surface of the base 145, and controls a signal for driving the motor 100.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a spindle motor, in which a holding magnet is directly mounted to a rotor cover, unlike the prior art, in which the holding magnet is mounted to a stator via a back yoke, and in which the holding magnet is installed adjacent to the upper portion of a bearing, unlike the prior art, in which an oil discharge preventing piece is installed to prevent oil from being discharged from the bearing, thus reducing the number of parts and increasing the yield rate.

What is claimed is:

1. A spindle motor, comprising:
   a rotating shaft;
   a rotor cover secured to the rotating shaft by a flange, the rotor cover rotating the rotating shaft;
   a bearing to rotatably support the rotating shaft;
   a holder to hold the bearing;
   a stator forming an electric field, coupled to an outer circumferential surface of the holder; and
   a holding magnet having a rectangular cross section positioned above the bearing, the holding magnet being directly mounted to an inner wall of the rotor cover adjacent to the flange,
   wherein the holding magnet is positioned above the bearing and has an inner diameter larger than an inner diameter of the bearing and smaller than an outer diameter of the bearing so that its magnetic force directly affects the bearing,
   the holding magnet is positioned above the stator and has an outer diameter larger than an inner diameter of the stator so that its magnetic force directly affects the stator, and
   an upper part and a lower part of the bearing contact the rotating shaft, an upper portion of the stator protrudes more upwardly than the holder so that a gap is formed between the upper portion of the stator and the upper part of the bearing, the holding magnet protrudes below the flange of the rotor cover to prevent oil from being discharged from the bearing to the outside, and an outer diameter of the lower part of the bearing is smaller than an inner diameter of the holder.

2. The spindle motor as set forth in claim 1, wherein the holding magnet is mounted to the rotor cover to be adjacent to the rotating shaft.

3. The spindle motor as set forth in claim 1, wherein a middle part of the bearing has an inner circumferential surface that does not contact the rotating shaft.

4. The spindle motor as set forth in claim 1, wherein a height of the bearing is equal to a height of the stator.

5. The spindle motor as set forth in claim 1, wherein the stator includes a recess formed in a radial direction from an inner end of an flat upper side of stator, and
   the holding magnet has an outer diameter smaller than an outer diameter of the recess.

* * * * *